US010078894B2

United States Patent
Ye et al.

(10) Patent No.: US 10,078,894 B2
(45) Date of Patent: Sep. 18, 2018

(54) METHOD AND APPARATUS FOR RESTORING IMAGE

(71) Applicant: Korea Advanced Institute of Science and Technology, Daejeon (KR)

(72) Inventors: Jong Chul Ye, Daejeon (KR); Kyong Hwan Jin, Daejeon (KR); Kyung Sang Kim, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 15/386,363

(22) Filed: Dec. 21, 2016

(65) Prior Publication Data

US 2017/0178325 A1  Jun. 22, 2017

(30) Foreign Application Priority Data

Dec. 22, 2015 (KR) .................. 10-2015-0183431

(51) Int. Cl.
| | |
|---|---|
| *G06T 7/00* | (2017.01) |
| *G06T 7/13* | (2017.01) |
| *G06T 5/10* | (2006.01) |
| *G06T 11/00* | (2006.01) |
| *G06T 5/00* | (2006.01) |
| *G06T 7/12* | (2017.01) |

(52) U.S. Cl.
CPC ............ *G06T 7/0012* (2013.01); *G06T 5/005* (2013.01); *G06T 5/10* (2013.01); *G06T 7/12* (2017.01); *G06T 7/13* (2017.01); *G06T 11/008* (2013.01); *G06T 2207/10081* (2013.01)

(58) Field of Classification Search
None
See application file for complete search history.

(56) References Cited

U.S. PATENT DOCUMENTS

2009/0232377 A1\* 9/2009 Miao .................. G06T 11/006
382/131

FOREIGN PATENT DOCUMENTS

| JP | 2013183977 | A | \* | 9/2013 |
| KR | 20130088953 | A | \* | 8/2013 |
| KR | 20150117417 | A |  | 10/2015 |

OTHER PUBLICATIONS

Okada, Kazunori, Dorin Comaniciu, and Arun Krishnan. "Robust anisotropic Gaussian fitting for volumetric characterization of pulmonary nodules in multislice CT." IEEE Transactions on Medical Imaging 24.3 (2005): 409-423.\*

Wu, Max C., Bruce H. Hasegawa, and Michael W. Dae. "Performance evaluation of a pinhole SPECT system for myocardial perfusion imaging of mice." Medical physics 29.12 (2002): 2830-2839.\*

(Continued)

*Primary Examiner* — Vu Le
*Assistant Examiner* — Tracy Mangialaschi
(74) *Attorney, Agent, or Firm* — Miller Canfield (57) ABSTRACT

Disclosed is a method and apparatus for restoring an image. The method and apparatus may detect boundary information associated with a boundary in an image, generate a reproducing kernel used to restore a hole in the image based on the detected boundary information, estimate hole information using the generated reproducing kernel, and restore the hole based on the estimated hole information.

12 Claims, 10 Drawing Sheets

(56) References Cited

OTHER PUBLICATIONS

Kner, Peter, et al. "High-resolution wide-field microscopy with adaptive optics for spherical aberration correction and motionless focusing." Journal of microscopy 237.2 (2010): 136-147.*

Sadowsky, Ofri, et al. "Hybrid cone-beam tomographic reconstruction: Incorporation of prior anatomical models to compensate for missing data." IEEE transactions on medical imaging 30.1 (2011): 69-83.*

Wang, Lung-Chun, and Yen-Chu Hung. "Hole filling of triangular mesh segments using systematic grey prediction." Computer-Aided Design 44.12 (2012): 1182-1189.*

Karp, Joel S., et al. "Continuous-slice PENN-PET: a positron tomograph with volume imaging capability." J Nucl Med 31.5 (1990): 617-627.*

Korean Office Action dated Oct. 18, 2016.

Robust Anisotropic Gaussian Fitting for Volumetric Characterization of Pulmonary Nodules in Multislice CT, Kazunori Okada. IEEE Transactions on Medical Imaging, vol. 24, No. 3, Mar. 2005.

\* cited by examiner

METHOD AND APPARATUS FOR RESTORING IMAGE

CROSS-REFERENCE TO RELATED APPLICATION(S)

This application claims the priority benefit of Korean Patent Application No. 10-2015-0183431 filed on Dec. 22, 2015, in the Korean Intellectual Property Office, the disclosure of which is incorporated herein by reference for all purposes.

BACKGROUND

1. Field

One or more example embodiments relate to a method and apparatus for restoring an image, and more particularly, to a method and apparatus for restoring an image obtained through a tomography.

2. Description of Related Art

Tomography refers to technology for noninvasively observing or capturing an object without an overlap between a certain cross section and a neighboring cross section of the object by rotating a detector by 180 degrees (°) or 360°. A tomographic apparatus may obtain data of a tomogram. However, due to a limited rotation angle by which the detector is rotated, data of a portion may be lost during the tomography.

For example, Korean Patent Publication No. 10-2015-0117417 published on Oct. 20, 2015, discloses a computed tomography (CT) image processing apparatus. The published technology discloses a programmable logic device including a central processing unit (CPU) configured to generate a restored three-dimensional (3D) image based on a CT image, a temporarily restored image, and a temporarily comparing image, and a plurality of parallel processing cores, in which an input image may be projected and transformed or be inversely projected and transformed in parallel for each angle through the parallel processing cores under the control of the CPU, and a result of the transformation may be transmitted to the CPU.

SUMMARY

An aspect provides a method and apparatus for restoring an image.

Another aspect also provides a method and apparatus for restoring an image using a reproducing kernel.

According to an aspect, there is provided an image restoring method including detecting boundary information of a three-dimensional (3D) image, generating a reproducing kernel used to restore a hole in the 3D image based on the detected boundary information, estimating hole information using the generated reproducing kernel, and restoring the hole based on the estimated hole information.

The detecting of the boundary information may include estimating a center of the 3D image, performing Gaussian fitting on the 3D image based on the estimated center of the 3D image, and detecting the boundary information based on the Gaussian fitting.

The estimating of the center of the 3D image may include estimating a centroid of the 3D image.

The detecting of the boundary information based on the Gaussian fitting may include calculating a full width at half maximum (FWHM) using a standard deviation obtained by the Gaussian fitting, and detecting the boundary information using the calculated FWHM.

The detecting of the boundary information using the FWHM may include detecting an axial direction with a greatest blurring distortion, correcting the FWHM in the axial direction to correspond to a numerical aperture (NA) of a lens capturing the 3D image, and detecting the boundary information using the corrected FWHM.

The generating of the reproducing kernel may include setting a shape of a boundary associated with the boundary information based on the boundary information and the center of the 3D image, setting an inside of the boundary to be a value, and generating the reproducing kernel by performing a Fourier transform on the 3D image.

The estimating of the hole information may include obtaining values of reference samples, generating a reproducing kernel matrix based on the obtained values of the reference samples and the reproducing kernel, determining a correlation coefficient of a correlation between the values of the reference samples using the generated reproducing kernel matrix, and estimating, as the hole information, a value of a hole sample in the hole using the determined correlation coefficient.

The generating of the reproducing kernel matrix may include generating the reproducing kernel matrix based on a distance between the values of the reference samples.

The determining of the correlation coefficient may include calculating an inverse matrix of the reproducing kernel matrix, and determining the correlation coefficient using the calculated inverse matrix.

The calculating of the inverse matrix may include calculating a singular value decomposition (SVD) of the reproducing kernel matrix, determining whether the reproducing kernel matrix has an inverse matrix based on the calculated SVD, adding a weight to the reproducing kernel matrix in response to the reproducing kernel matrix not having the inverse matrix, and calculating an inverse matrix of the reproducing kernel matrix to which the weight is added.

The estimating of the value of the hole sample may include estimating the value of the hole sample using a distance between the hole sample and each of the reference samples, the reproducing kernel, and the correlation coefficient.

The restoring of the hole may include restoring the hole by performing an inverse Fourier transform on the value of the hole sample.

According to another aspect, there is provided an image restoring apparatus including a memory configured to store a 3D image, and a processor configured to detect boundary information of a hole in the 3D image, generate a reproducing kernel used to restore the hole based on the detected boundary information, estimate hole information using the generated reproducing kernel, and restore the hole based on the estimated hole information.

The 3D image may be captured by a device for optical diffraction tomography, a device for digital breast tomography, or a device for scanning electron microscope tomography.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more read

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, a term "sample" and a term "voxel" may be used with a same meaning, and interchangeably used.

Figure 1:
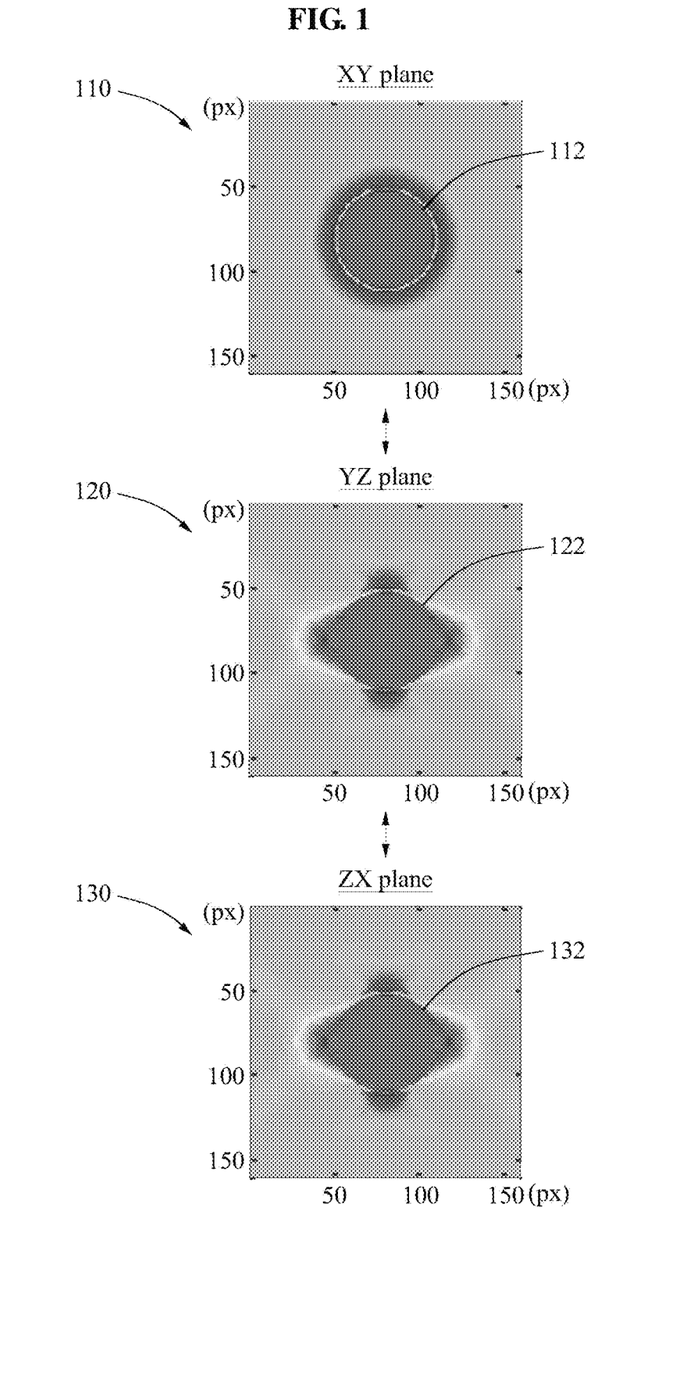
- FIG. 1 is a three-dimensional (3D) tomographic image with a lost region.

FIG. 1 is a three-dimensional (3D) tomographic image with a missing area.

Tomography refers to technology for noninvasively observing or capturing an object without an overlap between a cross section and a neighboring cross section by rotating a detector by 180 degrees (°) or 360°. A tomograph, or a tomographic device, configured to perform the tomography may include, for example, a device for optical diffraction tomography, a device for digital breast tomography, and a device for scanning electron microscope tomography.

Using such a tomographic device, data of a tomogram may be obtained, and a 3D image or model of an object may also be obtained from the data. For example, the data may be related to a frequency domain, and obtained from a Fourier domain. The data may be related to a k-space. The tomographic device may lose a portion of the data when performing the tomography due to a limited rotation angle for rotating the detector.

Referring to FIG. 1, a first image 110, a second image 120, and a third image 130 are cross sections of an obtained 3D image. The first image 110 is a cross section on an xy plane of the 3D image, the second image 120 is a cross section on a yz plane of the 3D image, and the third image 130 is a cross section on a zx plane of the 3D image. The 3D image may include a sample or a voxel. Hereinafter, the sample and the voxel may be used as having a same meaning, and interchangeably used.

The 3D image may include an area for which an image is not obtained because data is not obtained, and such an area is referred to as a hole. The hole may be of a conical shape centered at a low-frequency domain. Generation of such a hole may also be referred to as a missing cone.

The first image 110 includes a cross section 112 of the xy plane of the hole, the second image 120 includes a cross section of the yx plane of the hole, and the third image 130 includes a cross section 132 of the zx plane of the hole.

The generation of the hole may indicate potential generation of an image distortion due to a loss of the data of the low-frequency domain that includes a great amount of information. The image distortion may induce a blur in a direction in which the data is lost. An image restoring method by estimating data of a hole will be described hereinafter with reference to FIGS. 2 through 10.

Figure 2:
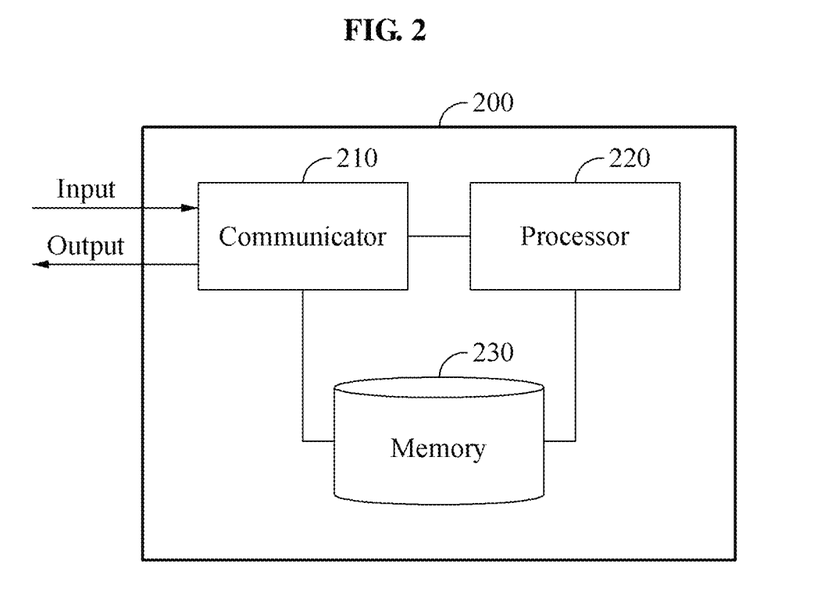
FIG. 2 is a diagram illustrating an image restoring apparatus according to an example embodiment.

FIG. 2 is a diagram illustrating an image restoring apparatus according to an example embodiment.

Referring to FIG. 2, an image restoring apparatus 200 includes a communicator 210, a processor 220, and a memory 230.

The communicator 210 may exchange data or information with an external device. For example, the communicator 210 may receive data of a 3D image from a tomographic device.

The processor 220 may be a hardware processor. The processor 220 may process the data received by the communicator 210 and data stored in the memory 230.

The memory 230 may store the data received by the communicator 210 and the data processed by the processor 220. For example, the memory 230 may store the 3D image. For another example, the memory 230 may store a program code through which the communicator 210 and the processor 220 are implemented.

The communicator 210, the processor 220, and the memory 230 will be described in detail with reference to FIGS. 3 through 10.

Figure 3:
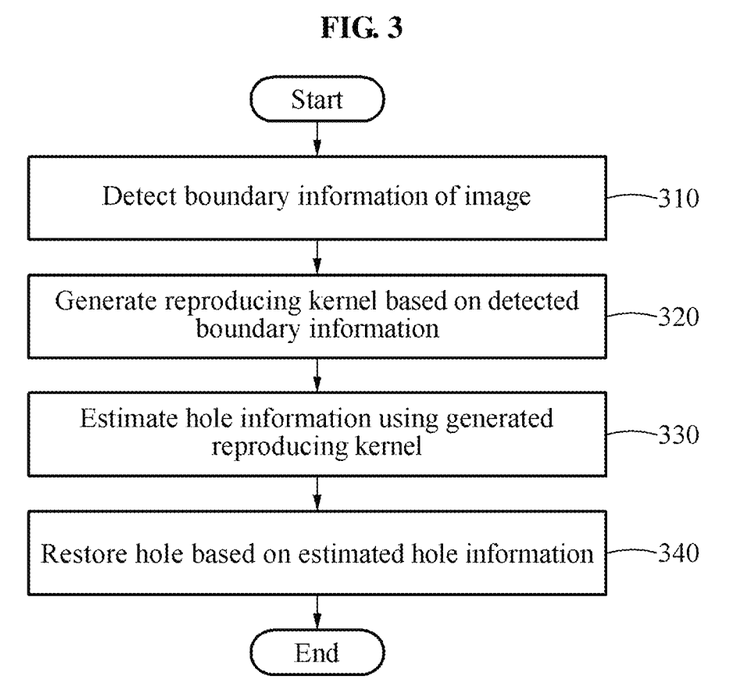
FIG. 3 is a flowchart illustrating an image restoring method according to an example embodiment.

FIG. 3 is a flowchart illustrating an image restoring method according to an example embodiment.

The image restoring method including operations 310 through 340 to be described hereinafter may use characteristics of a reproducing kernel Hilbert space (RKHS). An area in a 3D image in which an object is present may be a limited area in a real space, and thus data of the object is assumed to be band-limited in a space. The RKHS refers to a space in which a signal is present, and a reproducing kernel expressing all types of signals is present. Signals that are permanently present in a limited area may be included in the RKHS. In a case that data obtained through a tomographic device corresponds to an RKHS, data corresponding to a hole may be estimated only using the obtained data. The image restoring method including estimating hole data will be described hereinafter.

Referring to FIG. 3, in operation 310, the processor 220 detects boundary information of an object in a 3D image. The 3D image may be generated using data obtained from a tomographic device. The 3D image may include a hole that may be generated because data is not obtained. A method of detecting the boundary information will be described in detail with reference to FIGS. 4 through 6.

In operation 320, the processor 220 generates a reproducing kernel based on the detected boundary information. The reproducing kernel may be a self-reproducing kernel.

In operation 330, the processor 220 estimates hole information using the generated reproducing kernel. The reproducing kernel may estimate hole data or hole information using values of reference samples for which data is measured. The hole information to be estimated may correspond to a form of the data obtained from the tomographic device.

In operation 340, the processor 220 restores the hole based on the estimated hole information. For example, the estimated hole information may be a value of a Fourier domain. The hole in the 3D image may be restored by conversion of the value of the Fourier domain to a voxel value.

Figure 4:
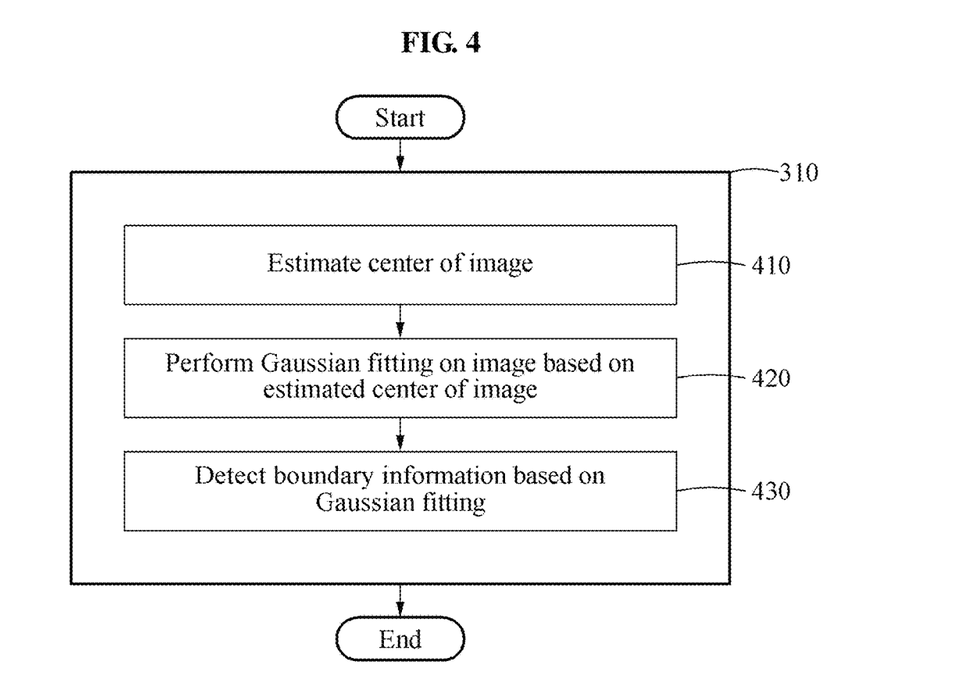
FIG. 4 is a flowchart illustrating a method of detecting boundary information according to an example embodiment.

FIG. 4 is a flowchart illustrating a method of detecting boundary information of a hole according to an example embodiment.

Operation 310 described with reference to FIG. 3 may include operations 410 through 430 to be described hereinafter.

Referring to FIG. 4, in operation 410, the processor 220 estimates a center of the 3D image. The center of the 3D image may be a centroid of a captured object.

In operation 420, the processor 220 performs a Gaussian fitting on the 3D image based on the estimated center of the 3D image. When the Gaussian fitting is performed on the 3D image, a modeling by which a model of the captured object being spread in a space may be performed. The Gaussian fitting may be used to predict a limited area. Through the Gaussian fitting, a Gaussian probability density function (PDF) may be calculated. The Gaussian PDF may be represented by Equation 1 below.

$$\bar{y}=A\exp\{-(x-m)^2/\sigma^2\}+B \quad [\text{Equation 1}]$$

In Equation 1, A and B denote a peak value of the Gaussian PDF and a bias, respectively. m denotes a value on an x axis indicating the peak value of the Gaussian PDF, and σ denotes a standard deviation. A, B, m, and σ that are most similar to actual values may be estimated.

In operation 430, the processor 220 detects a boundary based on the Gaussian fitting. The boundary refers to the limited area predicted by the Gaussian fitting. A method of detecting the boundary based on the Gaussian fitting will be described in detail with reference to FIG. 5.

Figure 5:
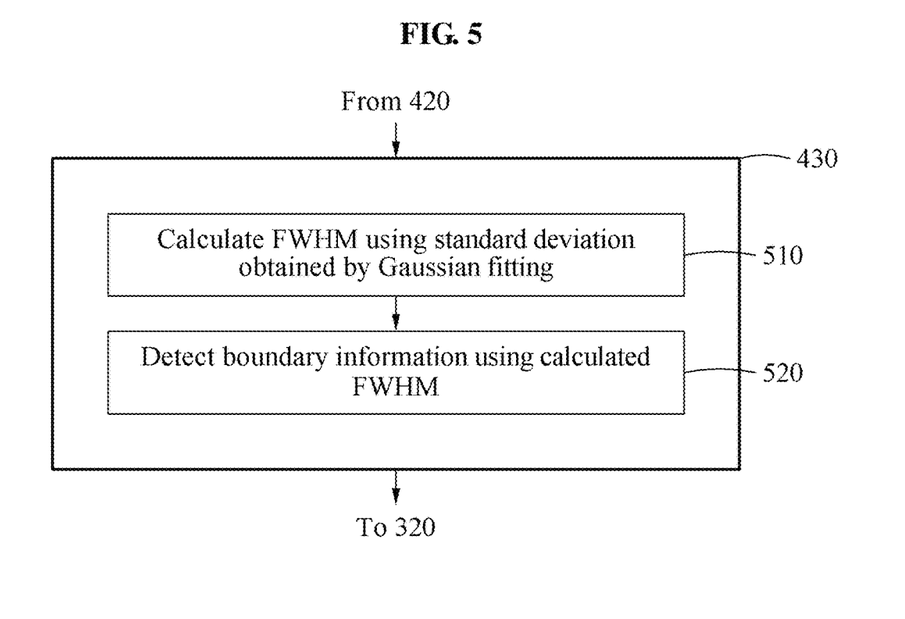
FIG. 5 is a flowchart illustrating a method of detecting boundary information using a full width at half maximum (FWHM) according to an example embodiment.

FIG. 5 is a flowchart illustrating a method of detecting boundary information using an FWHM according to an example embodiment.

Operation 430 described with reference to FIG. 4 may include operations 510 and 520 to be described hereinafter.

Referring to FIG. 5, in operation 510, the processor 220 calculates an FWHM using the standard deviation obtained by the Gaussian fitting. For example, the FWHM may be a value obtained by multiplying the standard deviation by 2.355.

In operation 520, the processor 220 detects the boundary information using the calculated FWHM. A method of detecting the boundary information using the FWHM will be described in detail with reference to FIG. 6.

Figure 6:
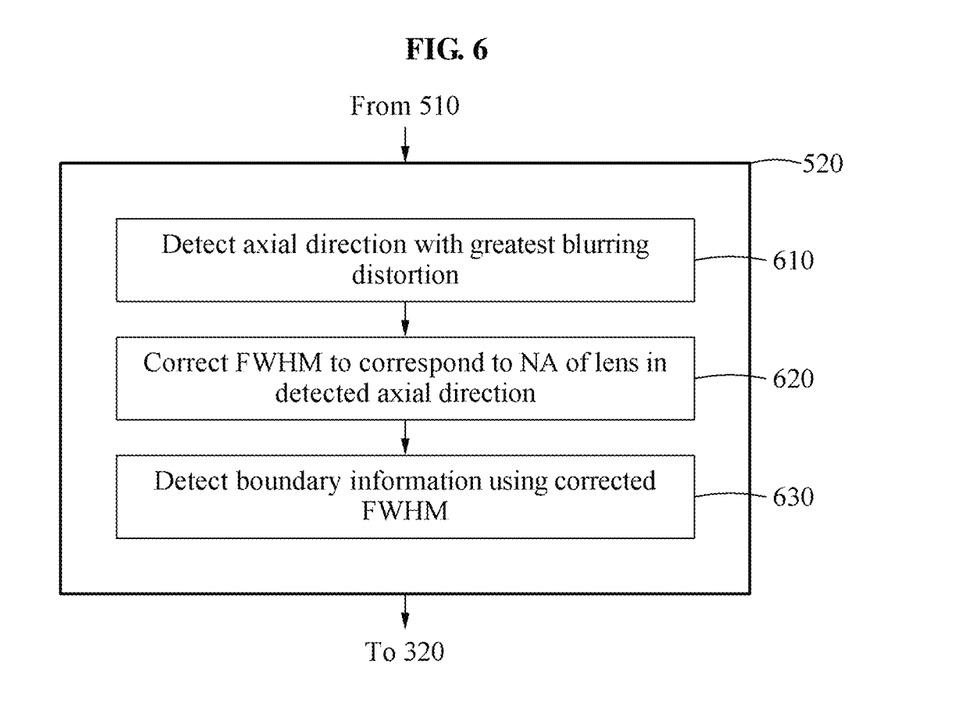
FIG. 6 is a flowchart illustrating a method of detecting boundary information using an FWHM in which a blurring distortion is corrected according to an example embodiment.

FIG. 6 is a flowchart illustrating a method of detecting boundary information using an FWHM in which a blurring distortion is corrected according to an example embodiment.

Operation 520 described with reference to FIG. 5 may include operations 610 through 630 to be described hereinafter.

Referring to FIG. 6, in operation 610, the processor 220 detects an axial direction with a greatest blurring distortion. For example, the processor 220 may detect an axial direction with a greatest blurring distortion among seven coordinate axes of a 3D image. The seven coordinate axes may include a starting point direction, a vertical direction of an xy plane, a vertical direction of an xz plane, a vertical direction of a yz plane, a vertical direction of an x axis, a vertical direction of a y axis, and a vertical direction of a z axis.

In operation 620, the processor 220 corrects the FWHM in the detected axial direction to correspond to a numerical aperture (NA) of a lens. For example, the lens may be a lens of a detector configured to capture the 3D image.

In operation 630, the processor 220 detects the boundary information using the corrected FWHM.

Figure 7:
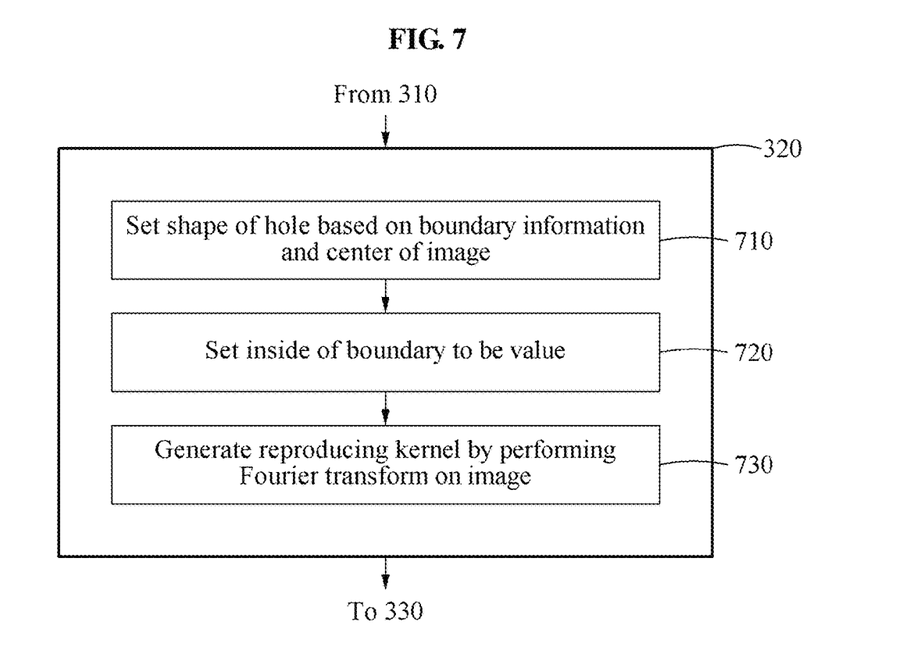
FIG. 7 is a flowchart illustrating a method of generating a reproducing kernel according to an example embodiment.

FIG. 7 is a flowchart illustrating a method of generating a reproducing kernel according to an example embodiment.

Operation 320 described with reference to FIG. 3 may include operations 710 through 730 to be described hereinafter.

Referring to FIG. 7, in operation 710, the processor 220 sets a shape of the boundary based on the boundary information and the center of the 3D image. For example, the shape of the boundary may be set by referring to a preset library. The library may include shapes, for example, a circle, an ellipse, and a hexahedron. For another example, the shape of the boundary may be received from a user.

In operation 720, the processor 220 sets an inside of the boundary to be a value. For example, samples in the boundary may be set to be values.

In operation 730, the processor 220 generates the reproducing kernel by performing a Fourier transform on the 3D image.

When an original 3D image of a captured object is present in a limited area in a space, the reproducing kernel that is inversely Fourier transformed with respect to the limited area may be generated.

$$y(t) = \begin{cases} y(t), & |t| \le W \\ 0, & |t| > W \end{cases} \quad \text{[Equation 2]}$$

In Equation 2, y(t) denotes a function in which a domain of definition $|t| \le W$ has a one-to-one correspondence.

$$h(t) = rect(1/W \cdot t) \overset{FT}{\longleftrightarrow} \hat{h}(\omega) = \frac{1}{\sqrt{2\pi W^2}} \operatorname{sinc}\left(\frac{\omega}{2\pi W}\right) \quad \text{[Equation 3]}$$

In Equation 3, h(t) denotes a rectangle function, and ĥ(w) denotes a function obtained by performing the Fourier transform. The reproducing kernel may be represented by Equation 4 below.

$$\hat{h}(|\omega_i - \omega_j|), \ \omega_i, \omega_j \in \Omega, \ \Omega \in R^N \quad \text{[Equation 4]}$$

In Equation 4, $\hat{h}(|\omega_i - \omega_j|)$ denotes the reproducing kernel, $\Omega$ denotes a set of sampled samples, and N denotes the number of all samples. The reproducing kernel may be generated in a Fourier domain.

Figure 8:
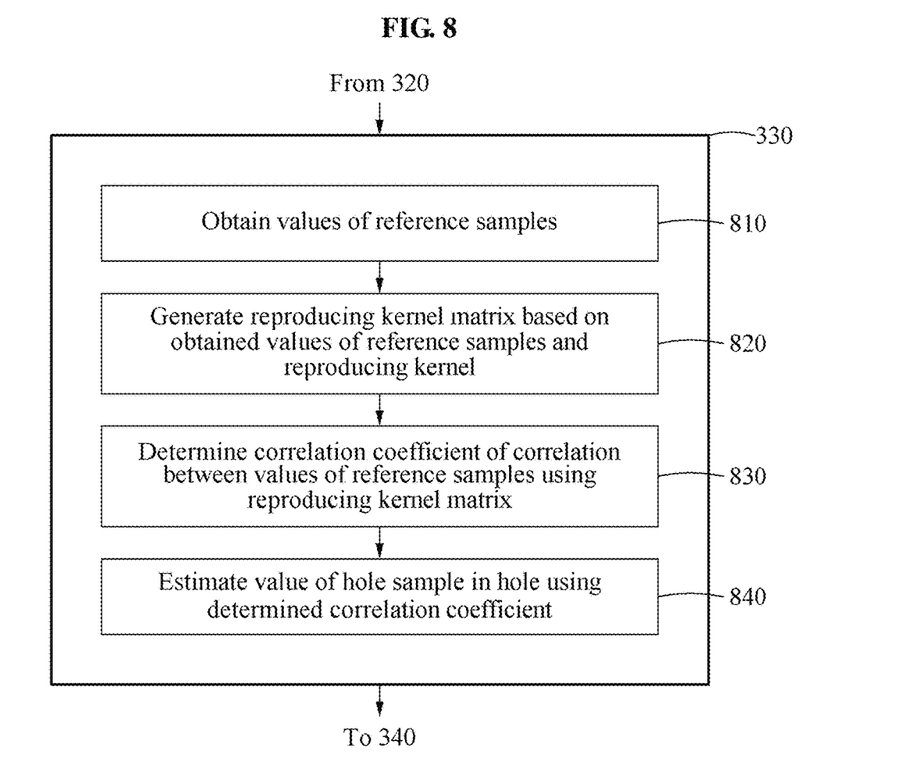
FIG. 8 is a flowchart illustrating a method of estimating hole information according to an example embodiment.

FIG. 8 is a flowchart illustrating a method of estimating hole information according to an example embodiment.

Operation 330 described with reference to FIG. 3 may include operations 810 through 840 to be described hereinafter.

Referring to FIG. 8, in operation 810, the processor 220 obtains values of reference samples. For example, a reference sample may refer to a sample for which data is actually obtained by a detector.

In operation 820, the processor 220 generates a reproducing kernel matrix based on the obtained values of the reference samples and the reproducing kernel.

A consistent reconstruction condition at locations of samples may be represented by Equation 5 below.

$$\hat{y}(\omega_i) = \sum_{j=1}^{N} a_j \hat{h}(|\omega_i - \omega_j|) \quad \text{[Equation 5]}$$

Based on the consistent reconstruction condition, for a sample with a measured value, a value of the sample may be estimated when using the reproducing kernel. Using the reproducing kernel, a reproducing coefficient $a_j$ may be calculated. All sampled samples may need to satisfy the consistent reconstruction condition. The consistent reconstruction condition may be converted to a matrix-vector equation as represented by Equation 6 below.

$$y = Ha \quad \text{[Equation 6]}$$

$$\begin{bmatrix} y_1 \\ y_2 \\ \vdots \\ y_N \end{bmatrix} = \begin{bmatrix} h(\omega_1, \omega_1) & h(\omega_1, \omega_2) & \cdots & h(\omega_1, \omega_N) \\ h(\omega_2, \omega_1) & h(\omega_2, \omega_2) & \cdots & h(\omega_2, \omega_N) \\ \vdots & \vdots & \ddots & \vdots \\ h(\omega_N, \omega_1) & h(\omega_N, \omega_2) & \cdots & h(\omega_N, \omega_N) \end{bmatrix} \begin{bmatrix} a_1 \\ a_2 \\ \vdots \\ a_N \end{bmatrix},$$

$$\omega_i \in \Omega$$

$$h(\omega_i, \omega_j) = h(|\omega_i - \omega_j|)$$

In Equation 6, H denotes a reproducing kernel matrix, and the reproducing kernel matrix may be generated based on a distance between values of samples. The samples may include a reference sample and a hole sample.

In operation 830, the processor 220 determines a correlation coefficient of a correlation between the values of the samples using the reproducing kernel matrix. That is, a vector a may be determined. A method of determining the correlation coefficient will be described in detail with reference to FIGS. 9 and 10.

In operation 840, the processor 220 estimates a value of the hole sample in the hole using the correlation coefficient. For example, the value of the hole sample may be estimated using Equation 7 below.

$$\hat{y}(\omega_m) = \sum_{j=1}^{N} a_j \hat{h}(|\omega_m - \omega_j|), \quad \text{[Equation 7]}$$

$$\omega_j \in \Omega,$$

$$\omega_m \in \Omega^c$$

In Equation 7, $\Omega^c$ denotes a set of hole samples, $\omega_m$ denotes a hole sample, and $\hat{y}(\omega_m)$ denotes an estimated value of the hole sample.

Using Equation 7, a matrix-vector equation as represented by Equation 8 below may be generated.

$$\tilde{y} = Ea \quad \text{[Equation 6]}$$

$$\begin{bmatrix} \tilde{y}(\omega_{m_1}) \\ \tilde{y}(\omega_{m_2}) \\ \vdots \\ \tilde{y}(\omega_{m_M}) \end{bmatrix} =$$

$$\begin{bmatrix} h(\omega_{m_1}, \omega_{s_1}) & h(\omega_{m_1}, \omega_{s_2}) & \cdots & h(\omega_{m_1}, \omega_{s_N}) \\ h(\omega_{m_2}, \omega_{s_1}) & h(\omega_2, \omega_{s_2}) & \cdots & h(\omega_2, \omega_N) \\ \vdots & \vdots & \ddots & \vdots \\ h(\omega_{m_M}, \omega_{s_1}) & h(\omega_{m_M}, \omega_{s_2}) & \cdots & h(\omega_{m_M}, \omega_{s_N}) \end{bmatrix}$$

$$\begin{bmatrix} a_1 \\ a_2 \\ \vdots \\ a_N \end{bmatrix},$$

-continued $\omega_{s_i} \in \Omega,$ $\omega_{m_i} \in \Omega^c$

Dissimilar to the reproducing kernel matrix H, a matrix E is a reproducing kernel matrix associated with the hole samples. The vector a associated with the correlation coefficient may be determined, and thus the value of the hole sample in the hole may be estimated based on the matrix E and the vector a.

In operation 340 described with reference to FIG. 3, the processor 220 restores the hole by performing an inverse Fourier transform on the value of the hole sample.

Figure 9:
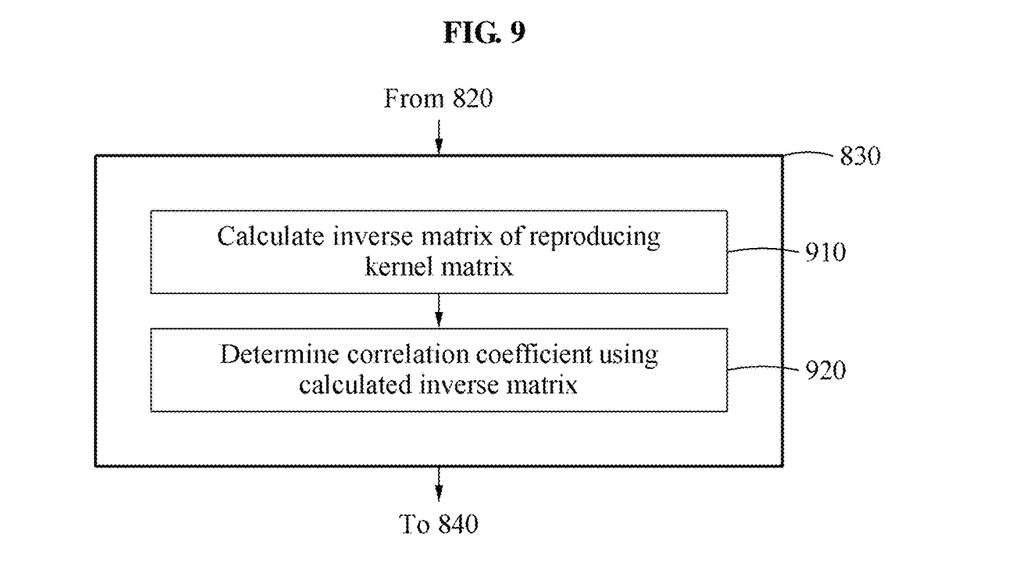
FIG. 9 is a flowchart illustrating a method of determining a correlation coefficient of a correlation between values of reference samples according to an example embodiment.

FIG. 9 is a flowchart illustrating a method of determining a correlation coefficient of a correlation between values of reference samples according to an example embodiment.

Operation 830 described with reference to FIG. 8 may include operations 910 and 920 to be described hereinafter.

Referring to FIG. 9, in operation 910, the processor 220 calculates an inverse matrix $H^{-1}$ of the reproducing kernel matrix H.

In operation 920, the processor 220 determines the correlation coefficient using the calculated inverse matrix $H^{-1}$. For example, the vector a associated with the correlation coefficient may be calculated by multiplying left and right portions of Equation 6 by the inverse matrix $H^{-1}$.

Figure 10:
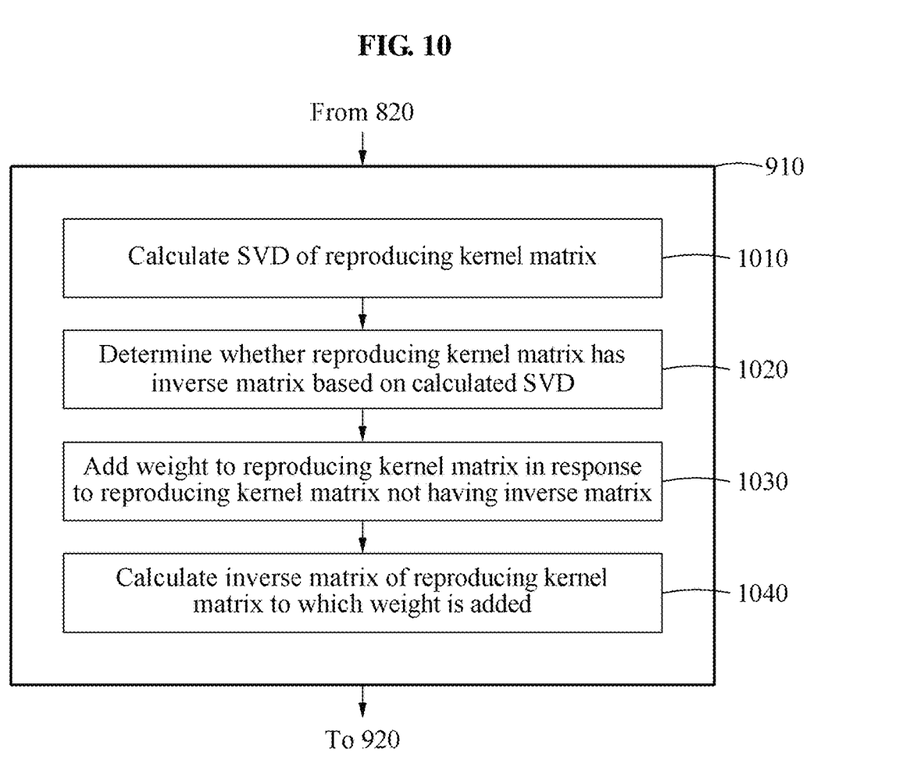
FIG. 10 is a flowchart illustrating a method of calculating an inverse matrix of a reproducing kernel matrix according to an example embodiment.

FIG. 10 is a flowchart illustrating a method of calculating an inverse matrix of a reproducing kernel matrix according to an example embodiment.

Operation 910 described with reference to FIG. 9 may include operations 1010 through 1040 to be described hereinafter.

Referring to FIG. 10, in operation 1010, the processor 220 calculates a singular value decomposition (SVD) of the reproducing kernel matrix.

In operation 1020, the processor 220 determines whether the reproducing kernel matrix has an inverse matrix based on the calculated SVD.

In operation 1030, the processor 220 adds a weight to the reproducing kernel matrix in response to the reproducing kernel matrix not having the inverse matrix. For example, the weight may be added to an eigenvalue of the reproducing kernel matrix. Here, the weight may be a maximum value among eigenvalues. The reproducing kernel matrix to which the weight is added may be represented by Equation 9 below, in which γ denotes the weight.

$$\tilde{H} = (H + \gamma I) \qquad \text{[Equation 9]}$$

In operation 1040, the processor 220 calculates an inverse matrix of the reproducing kernel matrix to which the weight is added.

<Additional Method>

According to another example embodiment, the equations described above may be more simplified under the assumption of a simple compactly supported kernel. When the reproducing kernel is compactly supported in a Fourier domain with a less number, the number of columns of the matrix E may decrease. In the simple compactly supported kernel, when a distance between samples is great, a value of the reproducing kernel may be set to be 0. For the simple compactly supported kernel having the characteristic described in the foregoing, a correlation coefficient may not be calculated. That is, a correlation coefficient associated with only samples close to a location of a hole sample to be restored may be calculated.

Under the assumption that energy of the reproducing kernel is located in [s/2] samples from a center, Equation 7 may be converted to Equation 10. Here, s denotes a length indicating a width of the reproducing kernel.

$$\hat{y}(\omega_m) = \sum_{j=1}^{s} a_j \hat{h}(|\omega_m - \omega_j|), \qquad \text{[Equation 10]}$$

$$\omega_j = \{\omega; |\omega - \omega_m| \le s\Delta\}$$

In Equation 10, Δ denotes a length of a minimum resolution of a discrete reproducing kernel obtained when performing discretization. Based on Equation 10, a size of the reproducing kernel matrix may be reduced to s×s, and an amount of calculation may be reduced. Due to the reduced size of the reproducing kernel matrix, a complexity in calculating an inverse matrix may be reduced to a ⅓ spared exponent. In addition, due to a reduced size of the matrix E used to obtain a value of a hole sample to be estimated, a complexity in calculation may be reduced.

The image restoring method may interpolate data in the Fourier domain, and thus most energy of the data may be distributed around a center frequency. In such a case, when a low frequency up to a threshold frequency is secured, an image may be configured from oversampled images only with a frequency less than or equal to the threshold frequency. A frequency domain less than the threshold frequency that is to be restored may be an effective low-frequency domain.

When restoring an area in a conical shaped, a double cone centered at a single axial direction may appear. Thus, by interpolating only data of an effective low-frequency domain in on direction from a central point of the double cone, an artifact may be reduced considerably, compared to data obtained by performing an inverse Fourier transform without interpolating the conical shape. Although a total number M of hole samples is reduced, an image quality may not be affected greatly.

Data of various dimensions may be interpolated using a compact support condition and an interpolation for the effective low-frequency domain.

When processing a 3D signal, a missing conical-shaped area may be formed in a 3D space, and a reproducing kernel may be indicated as a 3D tensor product of sinc functions obtained by a spatial limitation of each axis. A multidimensional Fourier domain may be independent from each axis, and thus the reproducing kernel may be generated by the tensor product. For a 3D mask generated due to a spatial limitation in a 3D space, a frequency response function of the reproducing kernel may be generated through an inverse Fourier transform, and thus a 3D function of a shape may be used as the reproducing kernel.

Although an inverse matrix of the matrix H may not be calculated based on a condition number of the matrix H, the image restoring method may change the condition number by reducing a size of the matrix H.

Table 1 presents results of analyzing gains in a practical calculation process.

TABLE 1

|  | Non-compact support condition | Compact support condition | Gain for compact support (ex. $d_M = 10$, $d_N = 10$) |
|---|---|---|---|
| Number of samples |  | N | — |
| Number of holes | M | $M/d_M$ | $d_M$ (=10) |
| Size of H | N × N | $(N/d_N) \times (N/d_N)$ | $d_N^2$ (=$10^2$) |
| Coefficient calculation fitting (Calculation of inverse matrix of H) | $O(N^3)$ | $O((N/d_N)^3)$ | $d_N^3$ (=$10^3$) |
| Estimation (Ea matrix vector multiplication) | O(MN) | $O(MN/(d_M d_N))$ | $d_M d_N$ (=$10^2$) |
| Storage space H | $N^2$ | $MN^2/(d_M d_N^2)$ | $M/(d_M d_N^2)$ |
| Storage space E | MN | $MN/(d_M d_N)$ | $d_M d_N$ (=$10^2$) |
| Remarks | E matrix parallel processing enabled | Both H and E matrices parallel processing enabled | In parallel processing, a storage space for H may be determined based on a size required for unit calculation $N^2/d_N^2$ and the number of threads (simultaneously considered) |

The components described in the example embodiments of the present disclosure may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image restoring method, comprising:
   detecting boundary information of a three-dimensional (3D) image;
   generating a reproducing kernel used to restore a hole in the 3D image based on the detected boundary information;

obtaining values of reference samples;
generating a reproducing kernel matrix based on the obtained values of the reference samples and the reproducing kernel;
calculating a singular value decomposition (SVD) of the reproducing kernel matrix;
determining whether the reproducing kernel matrix has an inverse matrix based on the calculated SVD;
in response to the reproducing kernel matrix not having the inverse matrix, adding a weight to the reproducing kernel matrix;
calculating an inverse matrix of the reproducing kernel matrix to which the weight is added;
determining a correlation coefficient of a correlation between the values of the reference samples using the calculated inverse matrix;
estimating a value of a hole sample in the hole as the hole information using the determined correlation coefficient; and
restoring the hole based on the estimated hole information.

2. The image restoring method of claim 1, wherein the detecting of the boundary information comprises:
estimating a center of the 3D image;
performing Gaussian fitting on the 3D image based on the estimated center of the 3D image; and
detecting the boundary information based on the Gaussian fitting.

3. The image restoring method of claim 2, wherein the estimating of the center of the 3D image comprises:
estimating a centroid of the 3D image.

4. The image restoring method of claim 2, wherein the detecting of the boundary information based on the Gaussian fitting comprises:
calculating a full width at half maximum (FWHM) using a standard deviation obtained by the Gaussian fitting; and
detecting the boundary information using the calculated FWHM.

5. The image restoring method of claim 4, wherein the detecting of the boundary information using the FWHM comprises:
detecting an axial direction with a greatest blurring distortion;
correcting the FWHM in the axial direction to correspond to a numerical aperture (NA) of a lens capturing the 3D image; and
detecting the boundary information using the corrected FWHM.

6. The image restoring method of claim 1, wherein the generating of the reproducing kernel comprises:
setting a shape of a boundary associated with the boundary information based on the boundary information and a center of the 3D image;
setting an inside of the boundary to be a value; and
generating the reproducing kernel by performing a Fourier transform on the 3D image.

7. The image restoring method of claim 1, wherein the generating of the reproducing kernel matrix comprises:
generating the reproducing kernel matrix based on a distance between the values of the reference samples.

8. The image restoring method of claim 1, wherein the estimating of the value of the hole sample comprises:
estimating the value of the hole sample using a distance between the hole sample and each of the reference samples, the reproducing kernel, and the correlation coefficient.

9. The image restoring method of claim 1, wherein the restoring of the hole comprises:
restoring the hole by performing an inverse Fourier transform on the value of the hole sample.

10. A non-transitory computer-readable storage medium storing a program to perform the method of claim 1.

11. An image restoring apparatus comprising:
a memory configured to store a three-dimensional (3D) image; and
a processor configured to detect boundary information of a hole in the 3D image, generate a reproducing kernel used to restore the hole based on the detected boundary information, obtain values of reference samples, generate a reproducing kernel matrix based on the obtained values of the reference samples and the reproducing kernel, calculate a singular value decomposition (SVD) of the reproducing kernel matrix, determine whether the reproducing kernel matrix has an inverse matrix based on the calculated SVD, in response to the reproducing kernel matrix not having the inverse matrix, add a weight to the reproducing kernel matrix, calculate an inverse matrix of the reproducing kernel matrix to which the weight is added, determine a correlation coefficient of a correlation between the values of the reference samples using the calculated inverse matrix, estimating a value of a hole sample in the hole as the hole information using the determined correlation coefficient, and restore the hole based on the estimated hole information.

12. The image restoring apparatus of claim 11, wherein the 3D image is captured by a device for optical diffraction tomography, a device for digital breast tomography, or a device for scanning electron microscope tomography.

* * * * *